(12) United States Patent
Peterson et al.

(10) Patent No.: US 11,837,761 B2
(45) Date of Patent: Dec. 5, 2023

(54) VEHICLE FUEL CELL AND FUEL CELL CONTROL SYSTEM

(71) Applicant: FORD GLOBAL TECHNOLOGIES, LLC, Dearborn, MI (US)

(72) Inventors: Craig Winfield Peterson, West Bloomfield, MI (US); Chris Weinkauf, Roseville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 18 days.

(21) Appl. No.: 17/668,064

(22) Filed: Feb. 9, 2022

(65) Prior Publication Data

US 2023/0253587 A1 Aug. 10, 2023

(51) Int. Cl.
*H01M 8/04746* (2016.01)
*H01M 8/04082* (2016.01)
*H01M 8/0438* (2016.01)
*H01M 8/04089* (2016.01)

(52) U.S. Cl.
CPC ............. *H01M 8/04753* (2013.01); *H01M 8/04097* (2013.01); *H01M 8/04201* (2013.01); *H01M 8/04388* (2013.01); *H01M 2250/20* (2013.01)

(58) Field of Classification Search
CPC ......... H01M 8/04753; H01M 8/04097; H01M 8/04201; H01M 8/04388
See application file for complete search history.

(56) References Cited

U.S. PATENT DOCUMENTS

| 2014/0212776 | A1  | 7/2014  | Osborne et al. |
| 2021/0202969 | A1* | 7/2021  | Tanaka ............ H01M 8/04753 |
| 2021/0336283 | A1  | 10/2021 | Matsusue |

FOREIGN PATENT DOCUMENTS

WO 2020071157 4/2020

* cited by examiner

*Primary Examiner* — Stewart A Fraser
(74) *Attorney, Agent, or Firm* — David B Kelley; Brooks Kushman.P.C.

(57) ABSTRACT

A vehicle includes a fuel cell stack, an ejector, a first injector, a second injector, and a controller. The fuel cell stack is configured to generate power to propel the vehicle. The fuel cell stack has an anode side. The ejector is configured to deliver hydrogen to the anode side. The ejector has a nozzle configured to accelerate and direct the hydrogen toward the anode side. The first and second injectors are configured to deliver hydrogen to the nozzle. The controller is programmed to, in response to a command to deliver hydrogen to the anode side, open each of the first and second injectors and subsequently close the second injector while the first injector remains open.

20 Claims, 4 Drawing Sheets

VEHICLE FUEL CELL AND FUEL CELL CONTROL SYSTEM

TECHNICAL FIELD

The present disclosure relates to vehicles having fuel cells.

BACKGROUND

Vehicles may include fuel cell systems that generate electrical power.

SUMMARY

A vehicle includes a fuel cell stack, an ejector, a first injector, a second injector, a recirculation loop, and a controller. The fuel cell stack is configured to generate power to propel the vehicle. The fuel cell stack has an anode side. The ejector is configured to deliver hydrogen to the anode side. The ejector defines a mixing chamber having an outlet that is in fluid communication with the anode side. The ejector has a nozzle configured to accelerate and direct the hydrogen into the mixing chamber. The first injector is configured to deliver hydrogen to the nozzle. The second injector is configured to deliver hydrogen to the nozzle separately from the first injector. The first and second injectors are configured to open to deliver hydrogen to the nozzle and close to forgo delivering hydrogen to the nozzle. The recirculation loop is configured to direct unconsumed hydrogen from the fuel cell stack to the mixing chamber. The controller is programmed to operate the first and second injectors via injection pulses to deliver hydrogen to the nozzle. The controller is further programmed to, during each injection pulse, open each of the first and second injectors to initiate the injection pulse and subsequently close the second injector while the first injector remains open.

A vehicle includes a fuel cell stack, an ejector, a first injector, and a second injector. The fuel cell stack is configured to generate power to propel the vehicle. The fuel cell stack has an anode side. The ejector is configured to deliver hydrogen to the anode side. The ejector defines a mixing chamber having an outlet that is in fluid communication with the anode side, a nozzle chamber having an outlet end that is in fluid communication with the mixing chamber, a first inlet port in direct fluid commination with the nozzle chamber, and a second inlet port in direct fluid commination with the nozzle chamber. The first injector is configured to inject hydrogen into the nozzle chamber via the first inlet port. The second injector is configured to inject hydrogen into the nozzle chamber via the second inlet port.

A vehicle includes a fuel cell stack, an ejector, a first injector, a second injector, and a controller. The fuel cell stack is configured to generate power to propel the vehicle. The fuel cell stack has an anode side. The ejector is configured to deliver hydrogen to the anode side. The ejector has a nozzle configured to accelerate and direct the hydrogen toward the anode side of the fuel cell stack. The first and second injectors are configured to deliver hydrogen to the nozzle. The controller is programmed to, in response to a command to deliver hydrogen to the anode side, open each of the first and second injectors and subsequently close the second injector while the first injector remains open.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

Figure 1:
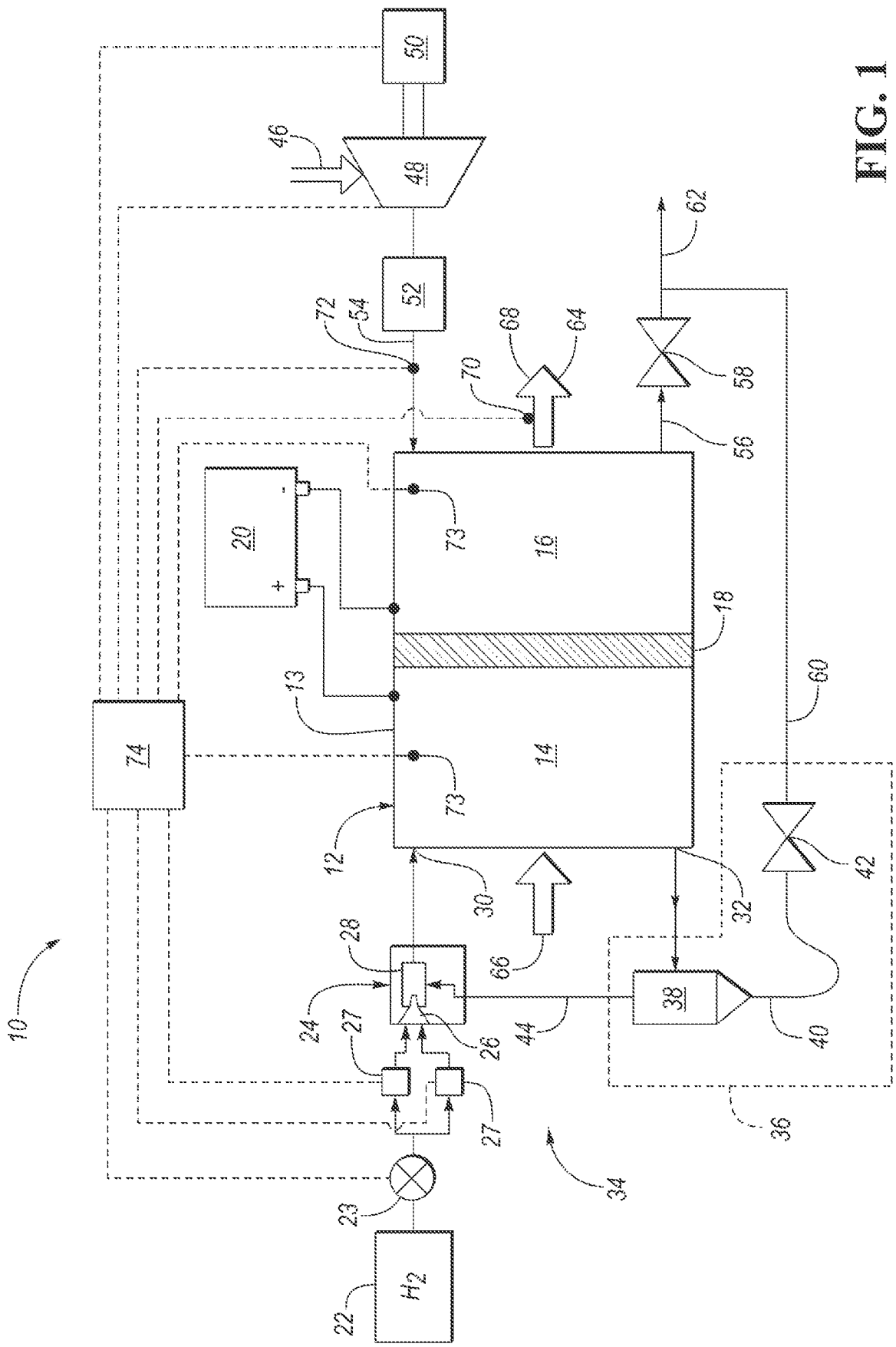
FIG. 1 is a schematic diagram representative of a fuel cell system.

FIG. 1 schematically illustrates a fuel cell system ("the system") 10 as a process flow diagram according to at least one embodiment. For example, system 10 may be used in a vehicle to provide electrical power to operate an electric motor to propel the vehicle or perform other vehicle functions. The system 10 may be implemented in a fuel cell based electric vehicle or a fuel cell based hybrid vehicle or any other such apparatus that uses electrical current to drive various devices.

The system 10 has a fuel cell stack ("the stack") 12. The stack 12 includes multiple cells, with each cell 13 having an anode side 14 (including an anode catalyst), a cathode side 16 (including a cathode catalyst), and a membrane 18 between the anode and cathode catalyst. Only one fuel cell 13 of the fuel cell stack 12 is illustrated in FIG. 1, although the stack 12 contains any number of cells. The stack 12 electrically communicates with and provides energy, for example, to a high voltage bus or a traction battery 20. The stack 12 generates stack current in response to electrochemically converting hydrogen and oxygen. The stack 12 may also have a cooling loop (not shown).

Various electrical devices may be coupled to the battery 20 to consume such power in order to operate. If the system 10 is used in connection with a vehicle, the devices may include a motor or a plurality of vehicle electrical components that each consume power to function for a particular purpose. For example, such devices may be associated with and not limited to a vehicle powertrain, cabin heating and cooling, interior/exterior lighting, entertainment devices, and power locking windows. The particular types of devices implemented in the vehicle may vary based on vehicle content, the type of motor used, and the particular type of fuel cell stack implemented.

During operation of the system 10, product water, residual fuel such as hydrogen, and byproducts such as nitrogen, may accumulate at the anode side 14 of the stack 12. Attempts have been made to remove the liquid product water and byproducts and to reuse the residual hydrogen and at least a portion of the water vapor. One approach is to collect those constituents in a purge assembly 36 downstream of the stack 12, separate at least a portion of the liquid water, and return the remaining constituents to the stack 12 via a return passageway in a recirculation loop.

A primary fuel source 22 is connected to the anode side 14 of the stack 12, such as a primary hydrogen source, to provide a supply fuel stream (or an anode stream). Non-limiting examples of the primary hydrogen source 22 are a high-pressure hydrogen storage tank or a hydride storage device. For example, liquid hydrogen, hydrogen stored in various chemicals such as sodium borohydride or alanates, or hydrogen stored in metal hydrides may be used instead of compressed gas. A tank valve 23 controls the flow of the supply hydrogen. A pressure regulator 25 may be included to regulate the flow of the supply hydrogen. The tank valve 23 may also be referred to as an inlet valve or an injection valve. The tank valve 23 is configured open to deliver the hydrogen to the anode side 14 and close to restrict hydrogen from flowing into the anode side 14.

The hydrogen source 22 is connected to one or more ejectors 24. The ejector may be a variable or multistage ejector or other suitable ejector. The ejector 24 is configured to combine the supply hydrogen (e.g., hydrogen received from the source 22) with unused hydrogen (e.g., recirculated from the fuel cell stack 12) to generate an input fuel stream. The ejector 24 controls the flow of the input fuel stream to the stack 12. The ejector 24 has a nozzle 26 supplying hydrogen into a mixing chamber 28. The mixing chamber 28 is connected to the input 30 of the anode side 14. A plurality of injectors 27 are configured are configured to deliver hydrogen from the source 22 directly to the nozzle 26. Each injector 27 is configured to deliver hydrogen to the nozzle 26 separately from the other injectors 27. The injectors 27 may be solenoid operated valves that open to deliver hydrogen to the nozzle 26 and close to forgo delivering hydrogen to the nozzle 26. The injectors 27 may open and close intermittently (e.g., via a pulse modulation method), when the stack 12 requires additional hydrogen based on a power demand, or when a pressure on the anode side 14 decreases to less than a threshold value. Although only two injectors 27 are illustrated, it should be understood that the system 10 may include two or more injectors.

The output 32 of the anode side 14 is connected to a recirculation loop 34. The recirculation loop 34 may be a passive recirculation loop, as shown, or may be an active recirculation loop according to another embodiment. Typically, an excess of hydrogen gas is provided to the anode side 14 to ensure that there is sufficient hydrogen available to all of the cells in the stack 12. In other words, under normal operating conditions, hydrogen is provided to the fuel cell stack 12 above a stoichiometric ratio of one, i.e. at a fuel-rich ratio relative to exact electrochemical needs. The unused fuel stream, or recirculated fuel stream, at the anode output 32 may include various impurities such as nitrogen and water both in liquid and vapor form in addition to hydrogen. The recirculation loop 34 is provided such that excess hydrogen unused by the anode side 14 is returned to the input 30 so it may be used and not wasted.

Accumulated liquid and vapor phase water is an output of the anode side 14. The anode side 14 requires humidification for efficient chemical conversion and to extend membrane life. The recirculation loop 34 may be used to provide water to humidify the supply hydrogen gas before the input 30 of the anode side 14. Alternatively, a humidifier may be provided to add water vapor to the input fuel stream.

The recirculation loop 34 contains a purging assembly 36 to remove impurities or byproducts such as excess nitrogen, liquid water, and/or water vapor from the recirculation stream. The purging assembly 36 includes a water separator or knock-out device 38, a drain line 40 and a control valve 42, such as a purge valve. The separator 38 receives a stream or fluid mixture of hydrogen gas, nitrogen gas, and water from the output 32 of the anode side 14. The water may be mixed phase and contain both liquid and vapor phase water. The separator 38 removes at least a portion of the liquid phase water, which exits the separator through drain line 40. At least a portion of the nitrogen gas, hydrogen gas, and vapor phase water may also exit the drain line 40, and pass through a control valve 42, for example, during a purge process of the fuel cell stack 12. The control valve 42 may be a solenoid valve or other suitable valve. The remainder of the fluid in the separator 38 exits through passageway 44 in the recirculation loop 34, which is connected to the ejector 24 (or more specifically is connected to the mixing chamber 28 of the ejector 24), as shown, or an active anode recirculation rotary device. The stream in passageway 44 may contain a substantial amount of hydrogen compared to the stream in drain line 40. The hydrogen in passageway 44 is fed into the mixing chamber 28 where it mixes with incoming hydrogen from the nozzle 26 and hydrogen source 22.

The cathode side 16 of the stack 12 receives oxygen in a cathode stream, for example, as a constituent in an air source 46 such as atmospheric air. In one embodiment, a compressor 48 is driven by a motor 50 to pressurize the incoming air. The pressurized air, or cathode stream, may be humidified by a humidifier 52 before entering the cathode side 16 at inlet 54. The water may be needed to ensure that membranes 18 for each cell 13 remain humidified to provide for optimal operation of the stack 12. The output 56 of the cathode side 16 is configured to discharge excess air and is connected to a valve 58. Drain line 60 from the purging assembly 36, may be connected to an outlet 62 downstream of the valve 58. In other embodiments, the drain lines may be plumbed to other locations in the system 10.

The stack 12 may be cooled using a coolant loop 64 as is known in the art. The coolant loop 64 has an inlet 66 and an outlet 68 to the stack 12 to cool the stack. The coolant loop 64 may have a temperature sensor 70 to determine the coolant temperature. The coolant temperature may correspond to a temperature of the stack 12 or a separate sensor may be used to determine the temperature of the stack 12, which may be communicated to the controller (74)

The stack 12 may also have a humidity sensor 72 positioned at the inlet 54 to the cathode side 16 of the stack 12. The sensor 72 may also include a temperature sensing module. Pressure sensors 73 may be utilized to determine the respective pressures within the anode side 14 of the stack 12 and the cathode side 16 of the stack 12. Temperature sensors (not shown) may also be utilized to determine the respective temperature within the anode side 14 of the stack 12 and the cathode side 16 of the stack 12.

A controller 74 receives signals from the sensors 70, 72, 73, and any other sensor that may be associated with the fuel cell system 10. The controller 74 may be a single controller or multiple controllers in communication with one another. The controller 74 may also be in communication with the valve 23, regulator 25, valve 42, valve 58, compressor 48, and motor 50.

During operation, the stoichiometric ratio of total reactant per reactant electrochemically needed for both reactants of the fuel cell system may be controlled based on the fuel cell operating state, environmental conditions, and the like. The stoichiometry may be controlled by using the valve 23 and regulator 25 on the anode side 14 to control the flow rate of fuel or hydrogen to the stack 12, and by using the compressor 48 and motor 50 on the cathode side 16 to control the flow rate of air to the stack 12. The system 10 may be operated through a range of fuel and air stoichiometric ratios. As the system 10 is operated at a lower power level, the amount of water byproduct will decrease, as the amount of current drawn from the stack 12 decreases.

Figure 2:
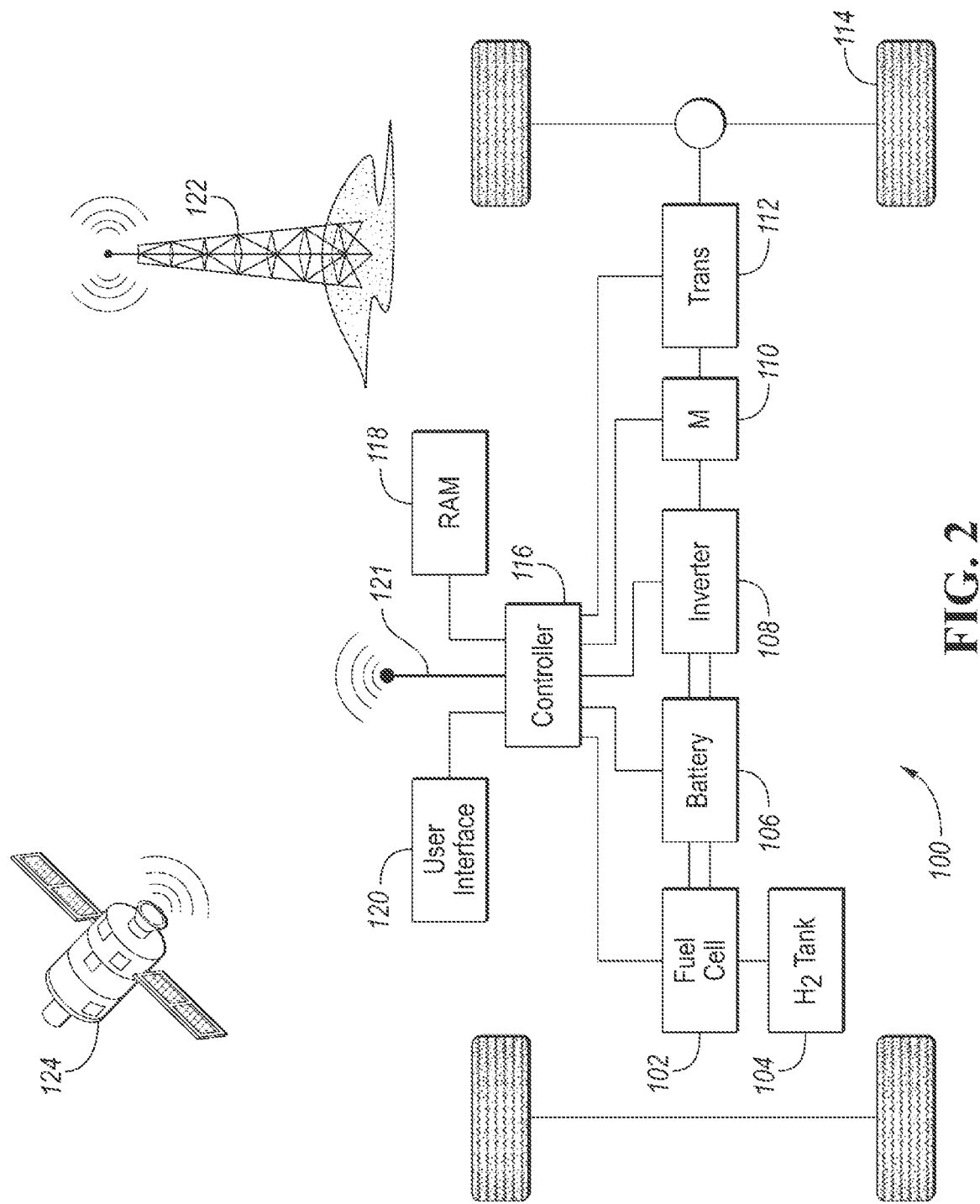
FIG. 2 is a schematic diagram representative of a vehicle that includes a fuel cell system.

FIG. 2 illustrates a vehicle 100 having a fuel cell system ("the system") 102 according to an embodiment. The system 102 may be a fuel cell system as described with respect to FIG. 1. The system 102 receives hydrogen from a storage tank 104 and air from the ambient environment to operate, and provides electrical power and energy to a battery 106 for storage. The battery 106 is connected to an inverter 108, which in turn powers an electric machine 110. The electric machine 110 may act as a motor to propel the vehicle 100, and in some embodiments, act as a generator to charge the battery 106. The electric machine 110 is connected to a transmission 112. The transmission 112 is connected to wheels 114 of the vehicle 100.

The vehicle has a control system 116. The control system 116 may include any number of controllers, and may be integrated into a single controller, or have various modules. Some or all of the controllers may be connected by a controller area network (CAN) or other system. The control system 116 may be connected to random access memory 118 or another data storage system. In some embodiments, the vehicle has a user interface 120 in communication with the control system 116. The user interface 120 may include an on-board vehicle system, and may also include a receiver configured to receive information and inputs from a remote user using a cellular phone, a computer, or the like. The user interface may also include a navigation system.

The control system 116 is in communication and is configured to control the system 102, battery 106, inverter 108, electric machine 110, and transmission 112. The control system 116 is also configured to receive signals from these vehicle components related to their status and the vehicle state.

The control system 116 has a receiver 121, which may include one or more antennae. Each antenna may be configured to wirelessly receive signals from various sources, including, but not limited to, cellular towers 122, satellites 124, wireless network servers, and the like.

The controllers 74, 116 described herein, may be part of a larger control system and may be controlled by various other controllers throughout the vehicle 100 or fuel cell system 10, such as a vehicle system controller (VSC). It should therefore be understood that the controllers 74, 116, and one or more other controllers, can collectively be referred to as a "controller" that controls various actuators in response to signals from various sensors to control various functions of the vehicle 100 or fuel cell system 10. The controllers 74, 116 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle 100 or fuel cell system 10.

Low current operation of a fuel cell system may be challenging for an ejector-based anode subsystem. Recirculation flow (e.g., the flowing of excess hydrogen unused by the anode side 14 to the mixing chamber 28 via recirculation loop 34) is typically accomplished via a pump or blower during such a low current operation. This is because the low primary flow from a proportional injector cannot provide a sufficient difference in pressure between the mixing chamber 28 and the recirculation loop 34 to generate recirculation through the recirculation loop 34. It may also be challenging to maintain an accurate measurement of primary flow from such a proportional injector. If an on/off injector is utilized, the duration of recirculation flow is fixed by the pressure limits of the stack. If the flow period is too long the cross-pressure limits between the anode and the cathode may be exceeded, which may place excessive stress on the membrane 18, which may decrease the lifetime of the membrane 18. Long injection pulses at low current operation may result in long off times because of the low hydrogen usage rate, which can reduce cell stability.

These potential issues can be solved by adding parallel injectors 27 to the supply side of the ejector 24. At the start of an injection pulse, all the injectors 27 are turned on in unison. This provides for a quick filling of the nozzle 26 and allows the ejector 24 to quickly achieve design flow velocity, which may be supersonic. Once the design pressure and flow conditions are present in the ejector 24, flow in the anode side 14 of the stack 12 achieves design delta pressure within a short period of time (typically less than 20 milliseconds). Once the flow is moving through the anode side 14 as desired, one or more of the injectors 27 may be turned off in order to slow or reverse the buildup of pressure in the system while still maintaining acceptable anode flow. In some operating regions this may also result in one injector 27 staying on and the other injector 27 or injectors 27 switching on and off. The net result will increase average recirculation flow and reduce the number of pressure fluctuations during the lifetime of the fuel cell stack 12. Such a control scheme will reduce the number of pressure pulses during the lifetime of the fuel cell stack 12, as well as the number of on and off pulses of the injectors 27, increasing lifetime of both the fuel cell stack 12 and the injectors 27.

By implementing a staged or asynchronous injection termination where multiple injectors 27 work collaboratively, the velocity of the hydrogen flow can be controlled in the primary jet (i.e., the flow from the nozzle 26) entering the anode side 14 of the stack 12 and more accurately account for the quantity of gas dispensed by the injectors 27. Such an approach eliminates the necessity of a pump or blower to recirculate gas in the anode loop at low current operation, by maintaining stream momentum. In addition, since the pump or blower is eliminated, there will be a net power gain to the fuel cell system 10 due to the elimination of parasitic power consumption by the pump or blower. Such an approach will increase the lifetime of the fuel cell stack 12 by delivering a more consistent and higher quantity of humidity to the inlet (e.g., input 30) of the anode side 14 of the stack 12. Such an approach will also increase the lifetime of the fuel cell stack 12 by reducing the number of pressure fluctuations that the membrane 18 is subjected to over the lifetime of the membrane 18. The lifetime of the injectors 27 will also be increased due to the reduction in the number of injection cycles.

Figure 3:
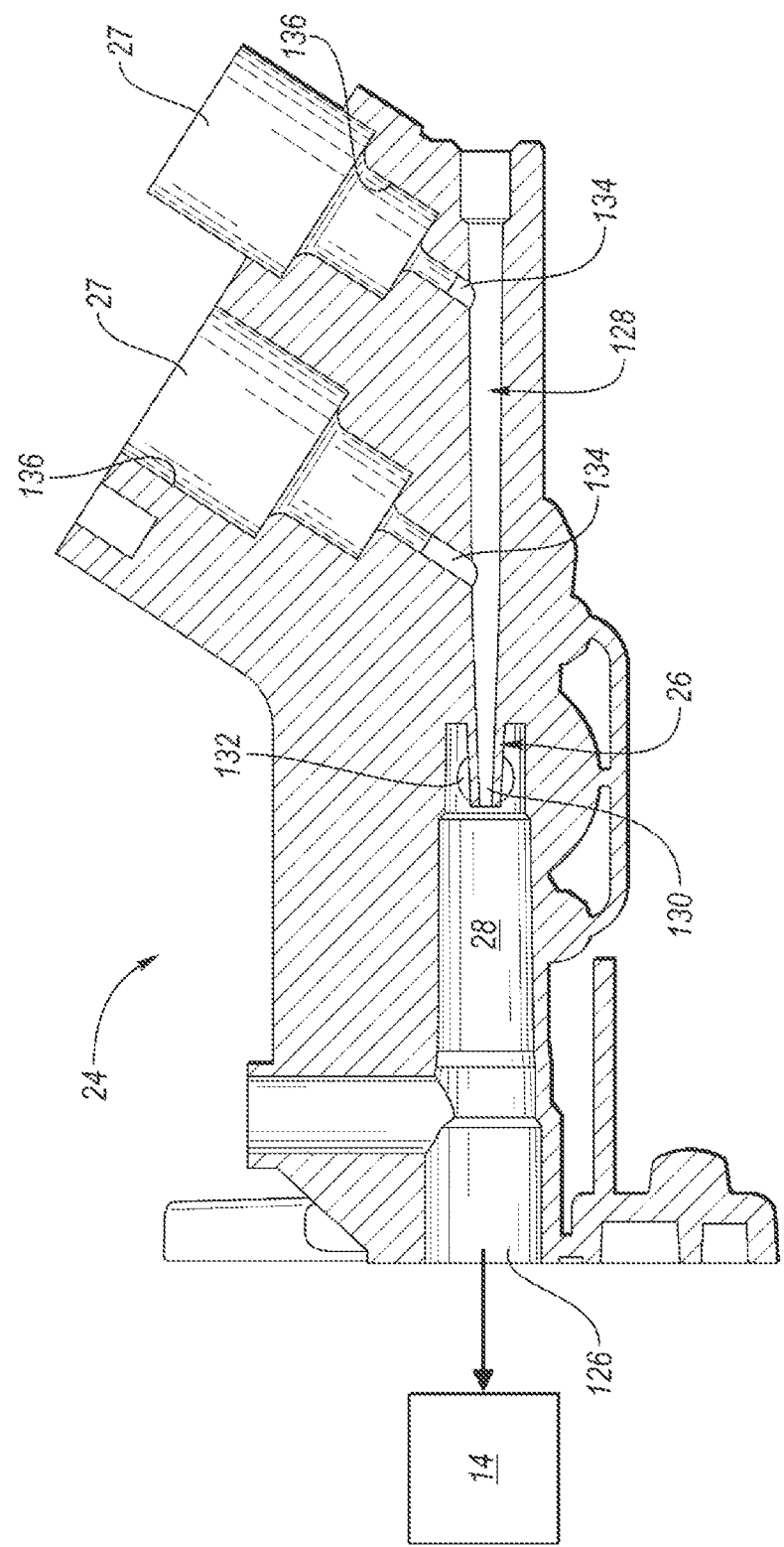
FIG. 3 is a cross-sectional view of an ejector that is configured to deliver hydrogen to a fuel cell stack of the fuel cell system.

Referring to FIG. 3, the ejector 24 and the injectors 27 are described in further detail. The mixing chamber 28 has an outlet 126 that is in fluid communication with the anode side 14. The nozzle 26 is configured to accelerate and direct the hydrogen into the mixing chamber 28. The nozzle 26 defines a nozzle chamber 128 that has an outlet end 130 that is in fluid communication with the mixing chamber 28. A recirculation port 132 connects and establishes fluid communication between the recirculation loop 34 (or more specifically passageway 44) and the mixing chamber 28. The recirculation port 132 may be disposed behind the nozzle 26 from a side perspective. The flow of hydrogen from the recirculation port 132 within the mixing chamber 28 may be substantially perpendicular to the flow of hydrogen from the nozzle 26 within the mixing chamber 28. Substantially perpendicular may refer to any incremental angle between exactly perpendicular and 15° from exactly perpendicular.

The ejector 24 further defines a plurality of inlet ports 134 that are in direct fluid communication with the nozzle chamber 128. The ejector 24 also defines a plurality of injector cavities 136 that are each configured to receive one of the injectors 27. Each injector cavity 136 is in fluid communication with one of the inlet ports 134. Each injector 27 is disposed within one the injectors cavities 136 and is positioned to inject hydrogen into the nozzle chamber 128 via the corresponding inlet port 134 (i.e., the inlet port 134 that is in fluid communication with the specific injector cavity 136 that the specific injector 27 is disposed in). Each inlet port 134 is arranged in parallel so that each injector 27 may deliver hydrogen to the nozzle chamber 128 independently and separately from the other injectors 27. Although only two injector cavities 136 and corresponding inlet ports 134 and are illustrated, it should be understood that the ejector 24 may define two or more injector cavities 136 and corresponding inlet ports 134 (e.g., one injector cavity 136 and corresponding inlet port 134 for each injector 27).

Figure 4:
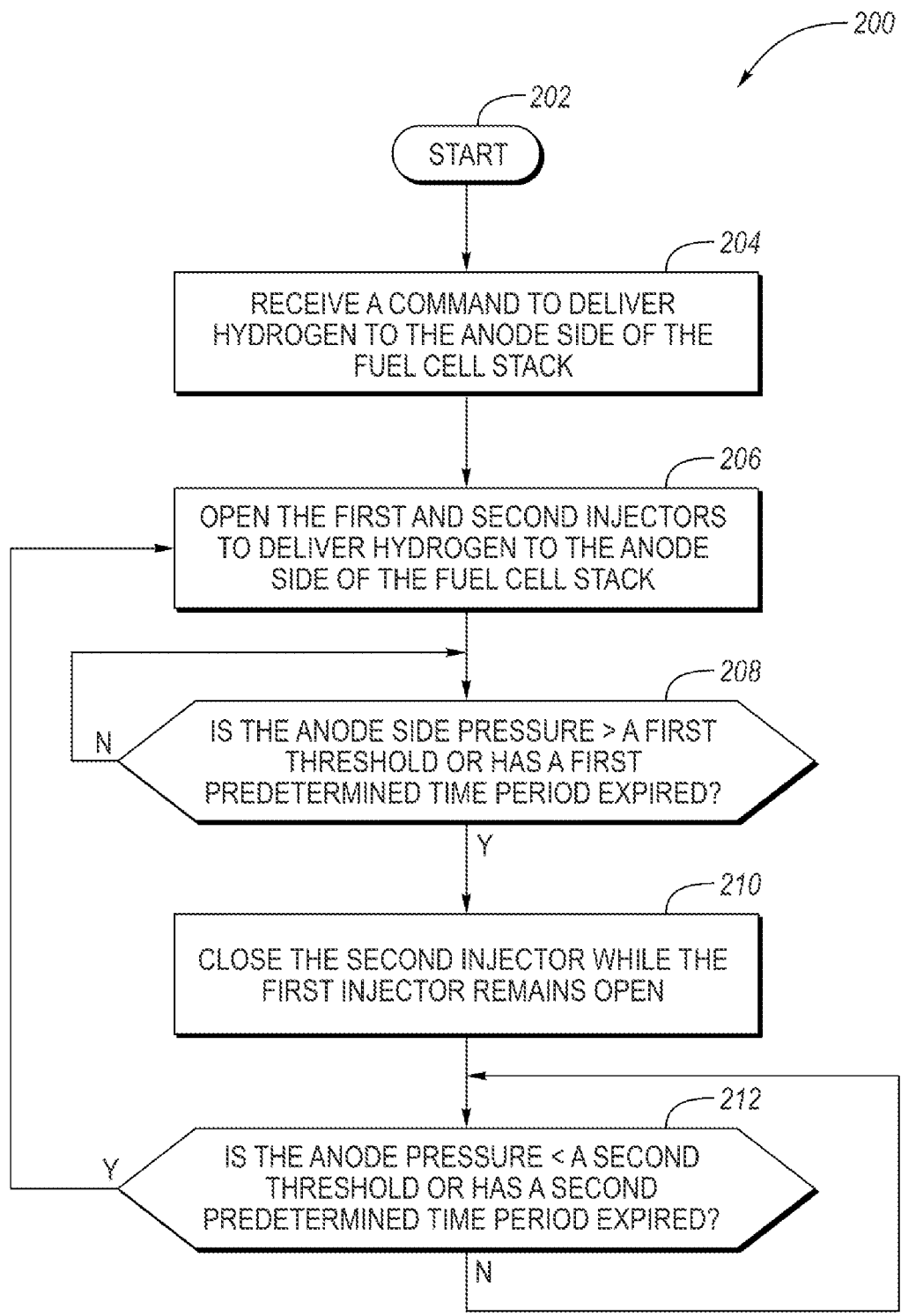
FIG. 4 is a flowchart illustrating a method of controlling the delivery of hydrogen to the fuel cell stack.

Referring to FIG. 4, a flowchart illustrating a method 200 of controlling the delivery of hydrogen to the fuel cell stack 12 is illustrated. The method 200 may be implemented by any of the controllers described herein (e.g., controller 74). The method 200 may be stored as control logic and/or algorithms within the controller. The controller may be configured to control the operation of various components of the fuel cell system 10 and/or vehicle 100 in response to various conditions of the fuel cell system 10 and/or vehicle 100. The method 200 begins at start block 202. The method 200 may be initiated at start block 202 once an ignition of the vehicle 100 has been turn to an "on" position.

The method 200 depicted in FIG. 4 may be representative of a single injection pulse where hydrogen is delivered from the injectors 27 via a series of spaced apart pulses according to a pulse method. It is noted that when such a pulse method is utilized, the injectors 27 are closed between pulses such that no hydrogen flows therefrom. Alternatively, the method 200 depicted in FIG. 4 may be representative of method where there is a continuous flow of hydrogen from at least one of the injectors 27.

Next, the method 200 moves on to block 204 where a command is generated and received to deliver hydrogen to the anode side 14 of the fuel cell stack 12. The command may be generated and received (i) intermittently (a pulse modulation method), (ii) in response to the stack 12 requiring additional hydrogen based on a power demand, (iii) in response to difference between a pressure on the anode side 14 and a pressure of the cathode side 16 decreasing to less than a threshold value, (iv) or in response to the ignition of the vehicle 100 being turned to the "on" position. In response to the command at block 204, each of the injectors 27 (e.g., the first and second injectors 27 if two are utilized) are then be opened at block 206 to deliver hydrogen to the nozzle 26 and ultimately to the anode side 14 of the fuel cell stack 12. If a pulse method is being employed, opening each of the injectors 27 initiates, starts, or is the beginning of a single injection pulse. Also, at block 206 each of the injectors 27 may be opened simultaneously or in unison.

Next, the method 200 moves on to block 208 where it is determined if the anode side pressure (i.e., the pressure of the anode side 14) has increased to greater than a first threshold or if a first predetermined time period has expired. If the anode side pressure has not increased to greater than the first threshold or if the first predetermined time period has not expired, the method 200 recycles back to the beginning of block 208. If the anode side pressure has increased to greater than the first threshold or if the first predetermined time period has expired, the method 200 moves on to block 210 where one or more of the injectors 27 are closed while one or more of the injectors 27 remains open. It is noted that if two injectors 27 are utilized, a second of the injectors 27 is closed while a first of the injectors 27 remains open at block 210.

Next, the method 200 moves on to block 212 where it is determined if the anode side pressure has decreased to less than a second threshold or if a second predetermined time period has expired. If the anode side pressure has not decreased to less than the second threshold or if the second predetermined time period has not expired, the method 200 recycles back to the beginning of block 212. If the anode side pressure has decreased to less than the second threshold or if the second predetermined time period has expired, the method 200 returns to block 206 where each of the injectors 27 that was closed at block 210 are reopened such that each of the injectors 27 (first and second injectors 27 if only two are utilized) are again in an open state. The first and second threshold may have the same value. Alternatively, the second threshold may be less than the first threshold to provide a hysteresis in order to eliminate the injectors being opened and closed at an excessive frequency.

At any time while the method 200 is in process, if the command to deliver hydrogen to the anode side 14 of the fuel cell stack 12 that was generated at block 204 is retracted, the method 200 may end. The command to deliver hydrogen to the anode side 14 of the fuel cell stack 12 may be retracted in response to a difference between the anode pressure (i.e., the pressure of the anode side 14) and the cathode pressure (i.e., the pressure of the cathode side 16) exceeding a third threshold, which is indicative of too high cross pressure, which could accelerate the mechanical wear of the membrane 18. In the event the method 200 ends, each of the injectors 27 (i.e., the first and second injectors 27 if only two injectors are utilized) are closed to prevent further hydrogen from being delivered to the anode side 14 of the fuel cell stack 12. If the difference between the anode pressure and the cathode pressure later decreases to less than the third threshold, the method 200 may generate another command to deliver hydrogen to the anode side 14 of the fuel cell stack 12, which may be received at block 204.

It should be understood that the flowchart in FIG. 4 is for illustrative purposes only and that the method 200 should not be construed as limited to the flowchart in FIG. 4. Some of the steps of the method 200 may be rearranged while others may be omitted entirely.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
    a fuel cell stack (i) configured to generate power to propel the vehicle and (ii) having an anode side;
    an ejector configured to deliver hydrogen to the anode side, the ejector (i) defining a mixing chamber having an outlet that is in fluid communication with the anode side and (ii) having a nozzle configured to accelerate and direct the hydrogen into the mixing chamber, wherein the nozzle (a) defines a single nozzle chamber and (b) has a nozzle tip that protrudes into the mixing chamber, the nozzle tip defining an opening that establishes fluid communication between the nozzle chamber and the mixing chamber;
    a first injector configured to deliver hydrogen to the nozzle;
    a second injector configured to deliver hydrogen to the nozzle separately from the first injector, wherein the first and second injectors are configured to (i) open to deliver hydrogen to the nozzle and (ii) close to forgo delivering hydrogen to the nozzle;
    a recirculation loop configured to direct unconsumed hydrogen from the fuel cell stack to the mixing chamber;
    a port that establishing fluid communication between the recirculation loop and the mixing chamber, wherein the port overlaps the nozzle tip within the mixing chamber; and
    a controller programmed to,
        operate the first and second injectors via injection pulses to deliver hydrogen to the nozzle, and
        during each injection pulse, (i) open each of the first and second injectors to initiate the injection pulse, (ii) maintain the open condition of each of the first and second injectors during a first portion the injection pulse, and (iii) close the second injector while the first injector remains open during a second portion of the injection pulse that is subsequent to the first portion of the injection pulse.

2. The vehicle of claim 1, wherein the controller is programmed to, in response to an anode side pressure exceeding a threshold during each injection pulse, close the second injector while the first injector remains open to transition from the first portion to the second portion of the injection pulse.

3. The vehicle of claim 2, wherein the controller is programmed to, in response to the anode side pressure decreasing to less than a second threshold after increasing to the threshold during one or more injection pulses, open the second injector.

4. The vehicle of claim 1, wherein the first and second injectors are open in unison to initiate each injection pulse.

5. The vehicle of claim 1, wherein (i) the ejector defines first and second inlet ports, (ii) the first and second inlet ports are separated from each other, and (iii) the first and second inlet ports are in direct fluid commination with the nozzle chamber.

6. The vehicle of claim 5, wherein first and second injectors are configured to deliver hydrogen to the nozzle via the first and second inlet ports, respectively.

7. A vehicle comprising:
    a fuel cell stack (i) configured to generate power to propel the vehicle and (ii) having an anode side;
    an ejector configured to deliver hydrogen to the anode side, the ejector (i) defining a mixing chamber having an outlet that is in fluid communication with the anode side, (ii) having a nozzle (a) defining a single nozzle chamber and (b) having a nozzle tip extending into the mixing chamber and defining an outlet end that establishes fluid communication between the nozzle chamber and the mixing chamber, (iii) defining a first inlet port in direct fluid commination with the nozzle chamber, and (iv) defining a second inlet port separated from the first inlet port and in direct fluid commination with the nozzle chamber;
    a first injector configured to inject hydrogen into the nozzle chamber via the first inlet port; and
    a second injector configured to inject hydrogen into the nozzle chamber via the second inlet port.

8. The vehicle of claim 7 further comprising (i) a recirculation loop configured to direct unconsumed hydrogen from the fuel cell stack to the mixing chamber and (ii) a port that establishing fluid communication between the recirculation loop and the mixing chamber, wherein the port overlaps the nozzle tip within the mixing chamber.

9. The vehicle of claim 7 further comprising a controller programmed to operate the first and second injectors via injection pulses to deliver hydrogen to the nozzle, and wherein the first and second injectors are configured to (i) open to deliver hydrogen to the nozzle and (ii) close to forgo delivering hydrogen to the nozzle.

10. The vehicle of claim 9, wherein the controller is further programmed to, during each injection pulse, (i) open each of the first and second injectors to initiate the injection pulse, (ii) maintain the open condition of each of the first and second injectors during a first portion the injection pulse, and (iii) close the second injector while the first injector remains open during a second portion of the injection pulse that is subsequent to the first portion of the injection pulse.

11. The vehicle of claim 10, wherein the controller is further programmed to, in response to an anode side pressure exceeding a threshold during each injection pulse, close the second injector while the first injector remains open to transition from the first portion to the second portion of the injection pulse.

12. The vehicle of claim 11, wherein the controller is programmed to, in response to the anode side pressure decreasing to less than a second threshold after increasing to the threshold during one or more injection pulses, open the second injector.

13. The vehicle of claim 9, wherein the first and second injectors are open in unison to initiate each injection pulse.

14. A vehicle comprising:
fuel cell stack (i) configured to generate power to propel the vehicle and (ii) having an anode side;
an ejector configured to deliver hydrogen to the anode side, the ejector having a nozzle (i) defining a single nozzle chamber and (ii) configured to accelerate and direct the hydrogen toward the anode side,
first and second injectors configured to deliver hydrogen to the nozzle chamber; and
a controller programmed to, in response to a command to deliver hydrogen to the anode side, (i) open each of the first and second injectors, (ii) maintain the open condition of each of the first and second injectors during a first time period, and (iii) close the second injector while the first injector remains open during a second time period that is subsequent to the first time period.

15. The vehicle of claim 14, wherein the controller is programmed to, in response to an anode side pressure exceeding a threshold while the first and second injectors are open, close the second injector while the first injector remains to transition from the first time period to the second time period.

16. The vehicle of claim 15, wherein the controller is programmed to, in response to the anode side pressure decreasing to less than a second threshold after increasing to the threshold, open the second injector.

17. The vehicle of claim 14, wherein (i) the ejector defines first and second inlet ports, (ii) the first and second inlet ports are separated from each other, and (iii) the first and second inlet ports are in direct fluid commination with the nozzle chamber, wherein first and second injectors are configured to deliver hydrogen to the nozzle via the first and second inlet ports, respectively.

18. The vehicle of claim 14, wherein the first and second injectors are open in unison to initiate each injection pulse.

19. The vehicle of claim 14, wherein (i) the ejector defines a mixing chamber and (ii) the nozzle has a nozzle tip extending into the mixing chamber and defining an outlet end that establishes fluid communication between the nozzle chamber and the mixing chamber.

20. The vehicle of claim 19 further comprising (i) a recirculation loop configured to direct unconsumed hydrogen from the fuel cell stack to the mixing chamber and (ii) a port that establishing fluid communication between the recirculation loop and the mixing chamber, wherein the port overlaps the nozzle tip within the mixing chamber.

* * * * *